US007448633B2

(12) United States Patent
Mollick

(10) Patent No.: US 7,448,633 B2
(45) Date of Patent: Nov. 11, 2008

(54) PEDIATRIC ASSISTANCE DEVICE

(76) Inventor: Mary Patrice Mollick, 220 Baier Dr., Salem, VA (US) 24153

( * ) Notice: Subject to any disclaimer, the term of this patent is extended or adjusted under 35 U.S.C. 154(b) by 253 days.

(21) Appl. No.: 11/034,353

(22) Filed: Jan. 13, 2005

(65) Prior Publication Data

US 2006/0150985 A1 Jul. 13, 2006

(51) Int. Cl.

| | |
|---|---|
| ***B62B 7/00*** | (2006.01) |
| ***B62B 9/00*** | (2006.01) |
| ***B62B 3/00*** | (2006.01) |
| ***B62B 5/00*** | (2006.01) |
| ***B60N 2/00*** | (2006.01) |

(52) U.S. Cl. ................ 280/47.38; 280/47.4; 280/47.41; 280/87.051; 280/87.041; 280/642; 280/647; 280/649; 280/650; 297/354.12

(58) Field of Classification Search ................ 280/47.4, 280/47.41, 47.38, 87.041, 87.051, 642, 647, 280/649, 650; 297/354.12

See application file for complete search history.

(56) References Cited

U.S. PATENT DOCUMENTS

| | | | | |
|---|---|---|---|---|
| 6,428,098 | B1 * | 8/2002 | Allbaugh | 297/219.12 |
| 6,471,222 | B1 * | 10/2002 | Hsia | 280/47.4 |
| 6,557,871 | B2 * | 5/2003 | Hsia | 280/47.38 |
| 6,666,505 | B2 * | 12/2003 | Greger et al. | 297/148 |
| 6,843,499 | B2 * | 1/2005 | Guo | 280/642 |
| 6,860,495 | B2 * | 3/2005 | Williamson | 280/47.38 |
| 6,896,326 | B2 * | 5/2005 | Chen | 297/256.13 |
| 7,025,364 | B1 * | 4/2006 | Clarke | 280/87.051 |
| 7,144,026 | B2 * | 12/2006 | Kao | 280/250.1 |
| 7,178,822 | B2 * | 2/2007 | Chen | 280/642 |
| 7,182,363 | B2 * | 2/2007 | Takubo et al. | 280/644 |
| 2002/0140196 | A1 * | 10/2002 | Crouch et al. | 280/87.051 |
| 2002/0158434 | A1 * | 10/2002 | Hsia | 280/47.4 |
| 2002/0163150 | A1 * | 11/2002 | Williamson | 280/47.38 |
| 2003/0197408 | A1 * | 10/2003 | Gregor et al. | 297/354.12 |
| 2004/0094922 | A1 * | 5/2004 | Eros | 280/47.38 |
| 2005/0029852 | A1 * | 2/2005 | Chen | 297/354.12 |
| 2005/0242535 | A1 * | 11/2005 | Chen | 280/47.38 |

* cited by examiner

*Primary Examiner*—Christopher Ellis
*Assistant Examiner*—John R Olszewski
(74) *Attorney, Agent, or Firm*—Lieberman & Brandsdorfer, LLC

(57) ABSTRACT

A pediatric assistance device useful in enabling a pediatric patient to participate in developmental and social stimulus during medical interventions.

10 Claims, 1 Drawing Sheet

PEDIATRIC ASSISTANCE DEVICE

BACKGROUND OF THE INVENTION

1. Field of the Invention

The present invention relates to a pediatric assistance device to enable a pediatric patient to participate in developmental and social stimulus during medical interventions.

2. Related Art

Many pediatric children requiring hospital care are often confined to their room during medical interventions such as intravenous and/or nutritional supplements (e.g. tube feedings). Although wheelchairs are equipped with an apparatus to hold medications and fluids for such feedings, there is no equipment designed with the younger patient in mind. Infants and toddlers are confined to cribs or infant seats within cribs or hospital beds during intravenous or nutritional supplements. This increases the difficulties with the process, both to the child and caregiver, of removing this age group from one social setting (such as a hospital play room) to receive such medical interventions. In most cases, these patients do not require any type of isolation due to their illness.

The importance of developmental and social stimulus is extremely critical in children; even more so for those with chronic medical conditions. It is therefore desirable to provide a pediatric assistance device that provides a safe environment for the pediatric patient without having to remove them from developmental and social stimulus to receive medical interventions.

SUMMARY OF THE INVENTION

The present invention provides a pediatric assistance device for providing support to a pediatric patient. The pediatric assistance device includes a frame having an apex region at the top portion of the frame and at least one stabilization bar attached at the bottom portion of the frame. The frame is adapted to receive a rod element for holding medical interventions for the pediatric patient. The frame can also include a pair of handles. The pediatric assistance device includes a chair adjustably attached to the frame. The chair includes a seat member and a back support member, wherein the back support member is pivotally connected to the seat member. Also the chair includes a means to permit pivotal movement of the back support member relative to the seat member incrementally over an angular range. The pediatric assistance device includes at least four wheels attached to said bottom portion of said frame wherein said pediatric assistance device provides comfort, social and developmental stimulus to the pediatric patient during medical interventions.

Also, the pediatric assistance device includes a tray that is removably attachable to the chair and the tray is configured to receive toys to assist in the development and stimulus of a pediatric patient.

BRIEF DESCRIPTION OF THE DRAWINGS

The advantage, nature, and various additional features of the invention will appear more fully upon consideration of the illustrative embodiment now to be described in detail in connection with accompanying drawing wherein.

Figure 1:
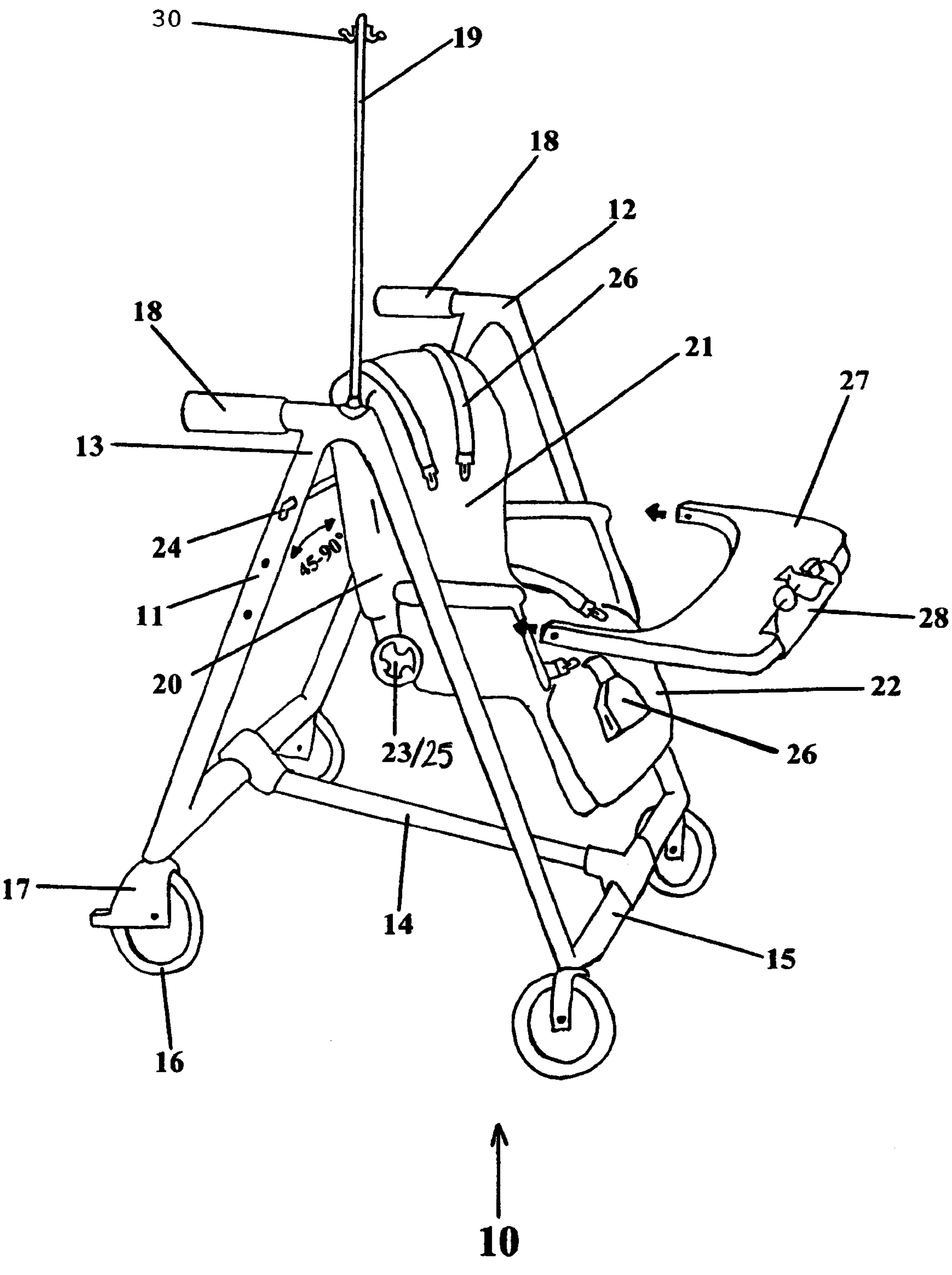
FIG. 1 is a schematic diagram of a pediatric assistance device according to an exemplary embodiment of the invention.

It should be understood that the drawing is for purposes of illustrating the concept of the invention and are not necessarily to scale.

DETAILED DESCRIPTION OF THE INVENTION

FIG. 1 shows pediatric assistance device 10 in accordance with the invention. Pediatric assistance device 10 provides a safe environment for pediatric patients to receive medical interventions, such as intravenous/nutritional supplements, as well as enabling pediatric patients to participate in developmental and social stimulus during medical interventions.

Pediatric assistance device 10 includes frame 11. Frame 11 includes an apex region 12 located at the top portion 13 of frame 11 and at least one stabilization bar 14 located at the bottom portion 15 of frame 11. Stabilization bar 14 strengthens and structurally supports frame 11 and enables safe use of pediatric assistance device 10.

Frame 11 is also adapted to removably receive rod element 19. Rod element 19 is slidably adjustable to keep medical interventions out-of-reach of a pediatric patient and to enable the easy transporting of medical interventions with the pediatric patient utilizing pediatric assistance device 10. Rod element 19 is also designed with delivery apparatus 30 to receive additional equipment that includes an intravenous infusion pump for example.

Frame 11 also includes at least four wheels 16 attached to bottom portion 15 of frame 11. Wheels 16 permit mobility of pediatric assistance device 10. Wheels 16 include brake devices 17 to assist in locking and maintaining wheels 16 in a fixed position. Brake devices 17 are known to those skilled in the art and include but are not limited to brake devices commonly used in children strollers or wheelchairs. Frame 11 can include handles 18. Handles 18 are located at the rear of frame 11 of pediatric assistance device 10. Handles 18 along with wheels 16 enable easy movement of pediatric assistance device 10 when pediatric assistance device is being utilized by a pediatric patient.

Frame 11 is also adapted to removably receive rod element 19. Rod element 19 is slidably adjustable to keep medical interventions out-of-reach of a pediatric patient and to enable the easy transporting of medical interventions with the pediatric patient utilizing pediatric assistance device 10. Rod element 19 is also designed with delivery apparatus 30 to receive additional equipment that includes an intravenous infusion pump for example.

Pediatric assistance device 10 also includes chair 20. Chair 20 is adjustably attached to frame 11. Chair 20 is attached to frame 11 similar to other children chairs that may be attached to a frame. Chair 20 includes back support member 21 and seat member 22. Chair 20 includes means to permit pivotal movement 23 of back support member 21 over an angular range of movement relative to seat member 22. The angular range of movement is approximately between 45 degrees and approximately 90 degrees. The angle of the back seat member relative to the seat member can help insure best absorption of certain medical interventions by a pediatric patient. Means to permit pivotal movement 23 can include bar/pin 24 that is slidably removable at the rear of frame 11 that can be adjusted to support back support member 21 at an angular range relative to seat member 22. Bar/pin 24 is well understood by those skilled in the art and includes for example bar/pins used to recline/incline exercise benches. A preferred embodiment in the present invention of means to permit pivotal movement 23 includes a locking system 25 associated or attached to back support member 21 and seat member 22, similar to those used in infant seats that are adjustable and lock and maintain the back support member over an angular range relative to the seat member.

Chair 20 includes five-point safety belt 26 to secure a pediatric patient within chair 20. Five-point safety belts are well known and commonly used in children car seats for safely restraining a child.

Chair 20 includes tray 27. Tray 27 is removably attached to chair 20 to assist in placement and removal of pediatric patient similar to trays used in infant seats used for feeding. Preferably tray 27 will be crescent shaped. Tray 27 is adapted to receive toys 28. Toys 28 will be washable and provide motor and developmental stimulus to a pediatric patient during and/or after feedings.

Pediatric assistance device 10 can be formed of metal or plastic.

Chair 20 can be covered, such as with an elastomeric material, for example vinyl, polyurethane, poly(vinyl chloride) or any other suitable material, or cloth for providing comfort to a pediatric patient sitting in chair 20. The elastomeric material or cloth can be removable, washable, and replaceable for the minimization of germ transmission and infection.

Pediatric patient is a small person or infant up to approximately 45 pounds.

Medical interventions include but are not limited to intravenous medicines and nutritional supplements such as tube feedings and vitamin/mineral supplements.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed:

1. A pediatric assistance device for providing support to a pediatric patient, said pediatric assistance device comprising:

a frame having an apex region at the top portion of said frame and at least one stabilization bar attached at the bottom of said frame;

said frame to receive a rod element provided with means to hold an apparatus to deliver material into the pediatric patient for internal feedings, wherein said delivery apparatus is located out-of-reach of the pediatric patient;

a pair of handles attached to said frame;

said frame having a chair, sized and configured to receive a pediatric patient, said chair adjustably attached to said frame, said chair comprising a seat member and a back support member, wherein said back support member is pivotally connected to said seat member;

a means to permit pivotal movement of said back support member relative to said seat member incrementally over an angular range, said means including: two rear members extending between the apex region and two rear wheels attached to the frame, said rear members having at least two aligned apertures, and a bar placed through one pair of the aligned apertures, wherein the bar placement defines an angular position of the seat; and at least two front wheels attached to said bottom portion of said frame to provide movement of said frame, wherein said mobile pediatric assistance device provides comfort, social and developmental stimulus to the pediatric patient during medical interventions.

2. The pediatric assistance device according to claim 1 wherein said chair further comprises a five-point safety belt, said five-point safety belt having two shoulder straps, a waist strap and a crotch strap for restraining the pediatric patient.

3. The pediatric assistance device according to claim 1 further comprising a tray, wherein said tray is removably attachable to said chair.

4. The pediatric assistance device according to claim 3 wherein said tray is configured to receive removably attachable toys.

5. The pediatric assistance device according to claim 1 further comprising at least two brake devices for locking and maintaining said wheels in a fixed position.

6. The pediatric assistance device according to claim 1 wherein said means to permit pivotal movement holds and maintains said back support member over an angular range of approximately 45degrees to approximately 90degrees relative to said seat member.

7. The pediatric assistance device according to claim 1 wherein said chair can receive a patient weighing up to 45pounds.

8. The pediatric assistance device according to claim 1 wherein said rod element is slidably adjustable.

9. The pediatric assistance device according to claim 1 wherein said delivered material is an intravenous fluid.

10. The pediatric assistance device according to claim 1 wherein said delivered material is medicinal.

* * * * *

UNITED STATES PATENT AND TRADEMARK OFFICE

CERTIFICATE OF CORRECTION

PATENT NO. : 7,448,633 B2

APPLICATION NO. : 11/034353

DATED : November 11, 2008

INVENTOR(S) : Mollick

It is certified that error appears in the above-identified patent and that said Letters Patent is hereby corrected as shown below:

Col. 2, please remove the paragraph beginning at line 15 and ending at line 22.

Signed and Sealed this

Thirty-first Day of March, 2009

JOHN DOLL

*Acting Director of the United States Patent and Trademark Office*